United States Patent [19]

Pouchot et al.

[11] Patent Number: 5,036,844

[45] Date of Patent: Aug. 6, 1991

[54] COVER ASSEMBLY AND PRE-FILTER FOR A RESPIRATOR

[75] Inventors: Thomas D. Pouchot, Gibsonia; John W. Monsted, Glenshaw, both of Pa.

[73] Assignee: Mine Safety Appliances Company, Pittsburgh, Pa.

[21] Appl. No.: 540,093

[22] Filed: Jun. 19, 1990

[51] Int. Cl.[5] ........................ A62B 18/08; B01D 51/00

[52] U.S. Cl. ........................... 128/206.17; 128/205.29; 128/206.16; 128/201.25; 55/318

[58] Field of Search ....................... 128/205.29, 201.25, 128/206.16, 206.17; 55/318, 320, 321, 322, 323, 334, 327

[56] References Cited

U.S. PATENT DOCUMENTS

| | | | |
|---|---|---|---|
| 2,744,523 | 5/1956 | Malcom, Jr. et al. | 128/206.17 |
| 2,744,524 | 5/1956 | Whipple | 128/206.17 |
| 2,744,525 | 5/1956 | Whipple | 128/206.17 X |
| 3,142,549 | 6/1964 | Klusewitz et al. | 128/206.17 X |
| 3,944,403 | 3/1976 | Simpson et al. | 128/206.17 X |
| 4,179,274 | 12/1979 | Moon | 128/206.17 X |
| 4,350,507 | 9/1982 | Greenough et al. | 128/201.25 X |
| 4,613,348 | 9/1986 | Natale | 55/318 |
| 4,771,771 | 9/1988 | Walther | 128/201.25 |
| 4,838,901 | 6/1989 | Schmidt | 55/74 |

FOREIGN PATENT DOCUMENTS 2070965 9/1981 United Kingdom .

*Primary Examiner*—Edgar S. Burr

*Assistant Examiner*—Eric P. Raciti

*Attorney, Agent, or Firm*—Reed Smith Shaw & McClay

[57] ABSTRACT

The present invention provides a cover assembly and pre-filter for use with a high-efficiency particulate filter of a respirator. The semi-rigid cover assembly fits easily and snugly over the high-efficiency particulate filter and remains in place due to friction between the edges of the ribs located on the inside of the cover housing and the sides of the high efficiency particulate filter. In this position, the ribs hold a removable pre-filter against the front face of the high-efficiency particulate filter while the cover housing protects both the pre-filter and high-efficiency particulate filter. This arrangement allows the inexpensive pre-filter which traps large diameter particulate matter, thereby extending the life of the more costly high-efficiency particulate filter, to be frequently and easily replaced.

5 Claims, 2 Drawing Sheets

COVER ASSEMBLY AND PRE-FILTER FOR A RESPIRATOR

FIELD OF THE INVENTION

The present invention relates to a cover assembly and pre-filter for a respirator and more particularly to a cover assembly which holds an inexpensive and removable pre-filter in place in front of a high efficiency particulate filter so that the pre-filter can be frequently and easily replaced.

BACKGROUND OF THE INVENTION

A high efficiency particulate filter is a relatively expensive filter which is often used in a breathing apparatus or respirator to capture very small diameter particulate matter. During use, however, such a filter often becomes quickly laden with larger diameter particulate matter. This larger size matter, however, can be successfully filtered by a less expensive pre-filter whereas its entrapment in the high efficiency filter significantly shortens the life of this costly device.

U.K. Patent No. 2,070,965 discloses a cup-shaped cover for a respirator filter. The filter is a single unit and includes a chemical filter and a particulate filter. It does not show a removable pre-filter positioned in front of a high efficiency particulate filter.

U.S. Pat. No. 4,771,771 discloses a pre-filter located in front of a chemical cartridge filter. The pre-filter, however, is fixed on the respirator and cannot be replaced to extend the life of the main filter.

U.S. Pat. No. 4,179,274 discloses a removable filter secured between a chemical cartridge and a cover. The cover, however, has an open grid face that allows air to be drawn directly through the face of the cover. As a result, this cover cannot provide the removable filter and the chemical cartridge with much protection against damage.

It would be desirable, therefore, to provide a removable cover assembly having an inexpensive pre-filter which is located in front of a high efficiency particulate filter to trap the larger particulate matter thereby preserving the more expensive filter. Further, it would be desirable if the pre-filter could be quickly and easily removed and exchanged as it becomes clogged. Finally it would be desirable to provide a cover assembly which protects the pre-filter as well as the high efficiency particulate filter from damage during use.

SUMMARY OF THE INVENTION

Generally, the present invention relates to a cover assembly and a pre-filter for a respirator wherein the cover assembly holds the pre-filter in place against the front surface of the high-efficiency particulate filter of a respirator. The cover assembly protects both the high-efficiency particulate filter and the pre-filter from damage during use and is easily removable so that the pre-filter can be easily and quickly replaced, thereby extending the useful life of the high-efficiency particulate filter. The cover assembly of the present invention comprise a cover housing, preferably of the same shape as the high-efficiency particulate filter. The cover housing comprises a front face, a side wall, and a plurality of ribs, disposed on the interior surface of the cover housing perpendicular to both the front face and the side wall. The cover housing and ribs are formed from a material that is semi-rigid, lightweight, non-brittle and non-corrosive, such as rubber or plastic. Disposed within the cover housing and on the ribs is a pre-filter, preferably of the same shape as the high-efficiency particulate filter, which is held against the front surface of the high efficiency particulate filter by the cover housing and ribs.

The cover assembly is designed to fit over both the pre-filter and the high-efficiency particulate filter, and is preferably round in shape, although it can be made in any shape which corresponds to the shape of the high-efficiency particulate filter over which it fits. The pre-filter should be of a size and shape to completely cover the inlet opening to the high-efficiency particulate filter.

The present invention can be snugly slipped over the high-efficiency particulate filter in such a way that an inside edge of the ribs provides a pressure fit. The cover assembly fits over the high-efficiency particulate filter and can maintain its sealing position due to friction between the inside edge of the ribs and the wall of the high-efficiency particulate filter. The cover assembly preferably holds the pre-filter between recesses in the ribs such that the pre-filter is located adjacent to the front surface of the high-efficiency particulate filter and maintains its position due to friction between the inside edge of the recesses in the ribs and the wall of the pre-filter.

Air flow through the pre-filter comes through the voids between the ribs along the side of the high efficiency particulate filter and makes a 180° turn in order to enter the front surface of the pre-filter. Advantageously, as the air makes this change in direction it deposits some of the particulate matter and moisture with which it is laden on the inside of the cover housing, thereby reducing the amount entering the pre-filter, and prolonging the life of the pre-filter.

The pre-filter can easily be replaced by the user of the respirator by simply pulling the cover assembly off of the high-efficiency particulate filter, removing the pre-filter from the recesses in the ribs, inserting a new pre-filter into the rib recesses and pushing the cover assembly back over the high-efficiency particulate filter. Once in place, the solid front face and side wall of the cover housing protects both the pre-filter and the high efficiency particulate filter from damage of any kind.

Other details, objects and advantages of the present invention will become apparent as the following description of a presently preferred embodiment of practicing the invention proceeds.

BRIEF DESCRIPTION OF THE DRAWINGS

In the accompanying drawings, a preferred embodiment of the present invention is illustrated, by way of example only, wherein.

DESCRIPTION OF THE PREFERRED EMBODIMENT

Figure 1:
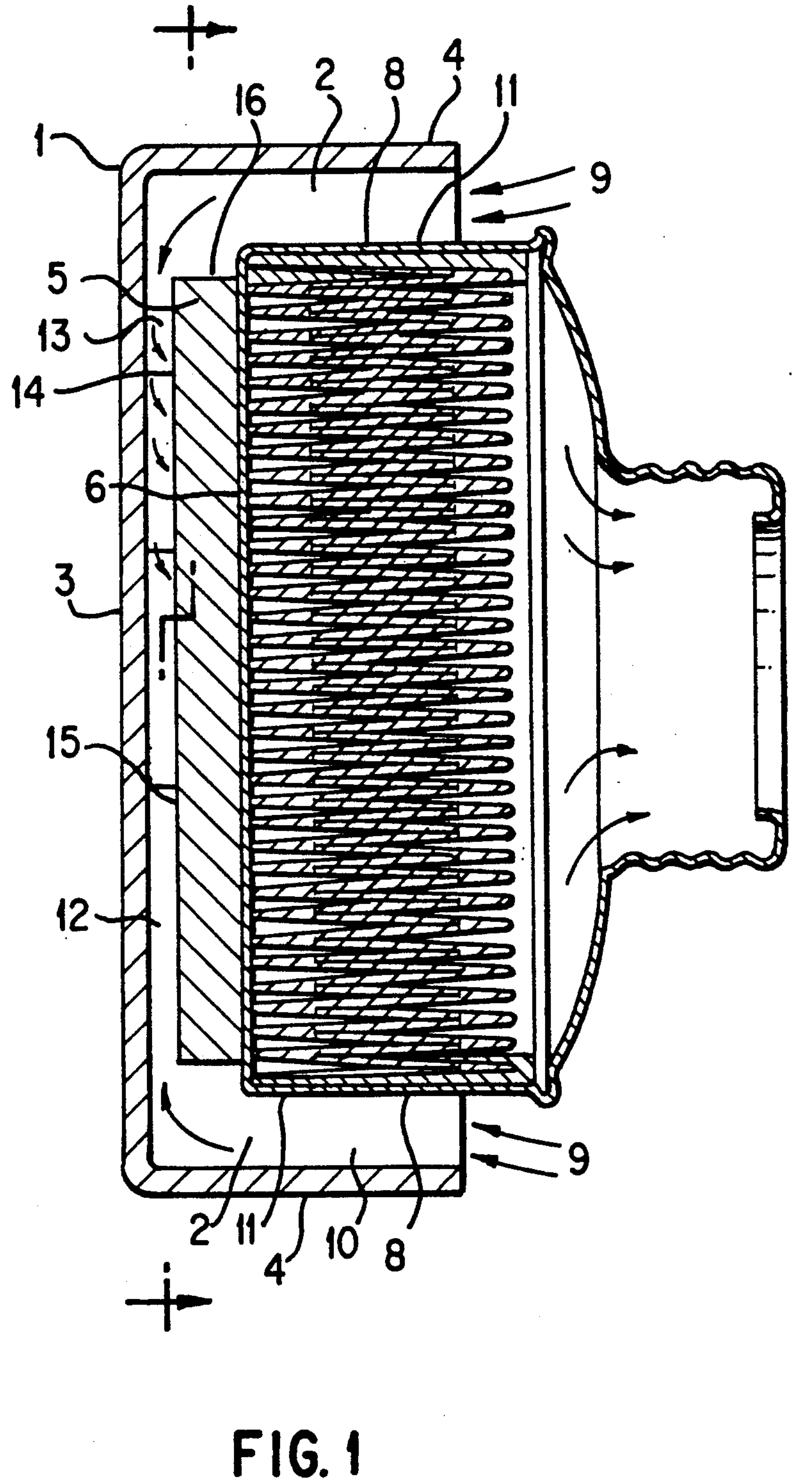
FIG. 1 is a sectional diagram of the cover assembly, pre-filter and high efficiency filter taken through the center thereof in a plane perpendicular to the front face of the cover housing.
Figure 2:
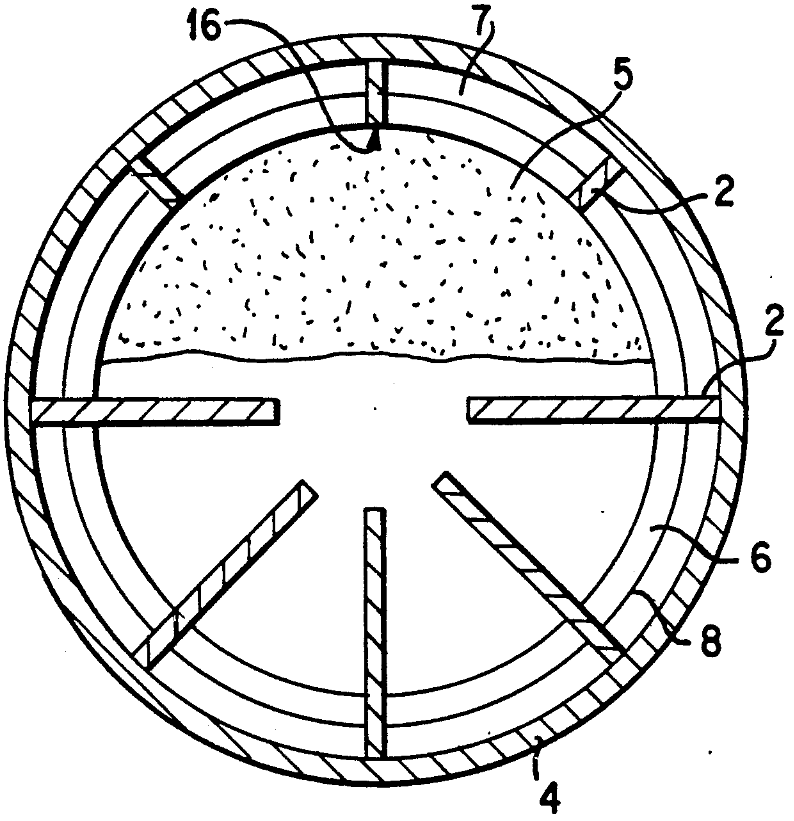
FIG. 2 is a split sectional diagram of the cover assembly and pre-filter taken in two planes parallel to the front face of the cover housing, partially at a point between the pre-filter and the cover housing and partially through the pre-filter.

As shown in FIGS. 1 and 2, a filter cover assembly comprises a cover housing 1 and a plurality of ribs 2. The cover housing comprises a solid front face 3 and a side wall 4 and contains a pre-filter 5. The cover assembly 1 fits over a high-efficiency particulate filter 6.

The cover housing 1 and ribs 2 are formed preferably from a semi-rigid, non-brittle, non-corrosive material such as rubber or plastic. The dimensions of the cover housing should be slightly greater than the dimensions of the high-efficiency particulate filter 6 so that a void 7 is formed between the side 8 of the high-efficiency particulate filter 6 and the side wall 4 of the cover housing 1 when the pre-filter and cover assembly is in place. This void 7 allows for air flow, shown by arrows 9 between the ribs 2 and into the pre-filter 5.

The side wall 4 of the cover housing 1 is substantially perpendicular to and located around the perimeter of the front face 3 of the cover housing 1.

The ribs 2 are preferably substantially perpendicular to both the front face 3 and the side wall 4 of the cover housing 1. The depth of the first portion 10 of the ribs 2 which is located along the side wall 4 of the cover housing 1 is one-half the difference between the inside dimension of the cover housing 1 and the dimension of the high-efficiency particulate filter 6, so that the distance between the inside edge 11 of opposite ribs 2 is exactly the dimension of the high-efficiency particulate filter 6.

The depth of the second portion 12 of the ribs 2 which is located along the interior of the front face 3 of the cover housing 1 is slightly greater than the thickness of the pre-filter 5 so that when the pre-filter and cover assembly is in place there is a space 13 between the inside surface of the face 3 and the front surface 14 of the pre-filter 5, to allow for air flow through void 7.

In the case of a round cover housing, the second portion 12 of the ribs 2 along the front face 3 of the cover housing 1 are discontinued at some distance from the center of the front face 3 of the cover housing 1, so that the ribs 2 which, in the case of a round cover housing are radially oriented and therefore converge on the center of the face 3 of the cover housing 1, do not interfere with one another. The second portion 12 of the ribs 2 along the face 3 are shaped with a recess 15 whose dimensions are such as to accommodate the snug placement of the pre-filter 5 between the inside edges 16 of the recesses 15 of the ribs 2.

While a presently preferred embodiment of practicing the invention has been shown and described with particularity in connection with the accompanying drawings, the invention may otherwise be embodied within the scope of the following claims.

What is claimed:

1. A respirator assembly comprising:

a high efficiency particulate filter having a front face of predetermined dimensions bounded by a contiguous side wall;

a removable pre-filter having dimensions substantially corresponding to the predetermined dimensions of the front face of the high-efficiency particulate filter and having a first face adapted for placement against the front face of the high-efficiency particulate filter;

a removable cover housing for substantially enveloping the removable pre-filter and for retaining the pre-filter in position against the high efficiency particulate filter, the removable cover housing including a front face of greater dimensions than the predetermined dimensions of the front face of the high-efficiency particulate filter, the front face of the cover housing being bounded by a contiguous side wall substantially circumscribing and spaced from the side wall of the high-efficiency particulate filter when the respirator assembly is in an assembled condition; and spacer means carried by the cover housing for releasably securing the cover housing to the high-efficiency paticulate filter by a friction fit and for spacing an interior surface of the front face of the cover housing from the pre-filter and for spacing the side wall of the cover housing from the side wall of the high-efficiency particulate filter, said spacer means providing continuous air flow space between the spaced side walls of the cover housing and the high-efficiency particulate filter and between the interior surface of the front face of the cover housing and the pre-filter.

2. The respirator assembly as described in claim 1 wherein the spacer means comprises a plurality of ribs having first edge regions constructed and arranged for abutting engagement with a second face of the removable pre-filter opposite the first face thereof.

3. The respirator assembly as described in claim 2 wherein the ribs have second edge regions constructed and arranged for frictional engagement with the side wall of the high-efficiency particulate filter.

4. The respirator assembly as described in claim 3 wherein the ribs have third edge regions constructed and arranged for frictional engagement with a side wall of the removable pre-filter.,

5. The respirator assembly as described in claim 1 wherein the cover housing is formed of semi-rigid material.

* * * * *